US008108690B2

(12) United States Patent
Kim

(10) Patent No.: US 8,108,690 B2
(45) Date of Patent: Jan. 31, 2012

(54) PASSWORD-PROTECTED DATA WRITING AND REPRODUCING DEVICE AND METHOD

(75) Inventor: I-gil Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1539 days.

(21) Appl. No.: 11/186,772

(22) Filed: Jul. 22, 2005

(65) Prior Publication Data

US 2006/0020827 A1    Jan. 26, 2006

(30) Foreign Application Priority Data

Jul. 24, 2004   (KR) ........................ 10-2004-0057900

(51) Int. Cl.
*G06F 12/14*    (2006.01)
*G06F 17/30*    (2006.01)
*H04N 7/167*    (2011.01)

(52) U.S. Cl. ............... 713/193; 380/210; 726/2; 726/26

(58) Field of Classification Search ........................ None
See application file for complete search history.

(56) References Cited

U.S. PATENT DOCUMENTS

| | | | | |
|---|---|---|---|---|
| 6,173,402 | B1 * | 1/2001 | Chapman | 713/182 |
| 6,195,126 | B1 * | 2/2001 | Kikuchi et al. | 348/231.3 |
| 6,643,451 | B1 * | 11/2003 | Tokura et al. | 386/94 |
| 6,959,394 | B1 * | 10/2005 | Brickell et al. | 726/5 |
| 6,985,583 | B1 * | 1/2006 | Brainard et al. | 380/44 |
| 7,047,408 | B1 * | 5/2006 | Boyko et al. | 713/169 |
| 7,124,301 | B1 * | 10/2006 | Uchida | 713/189 |
| 2002/0144270 | A1 | 10/2002 | Mizushiro et al. | |
| 2004/0153654 | A1 * | 8/2004 | Handa et al. | 713/182 |
| 2004/0177262 | A1 * | 9/2004 | Lee | 713/193 |

FOREIGN PATENT DOCUMENTS

| | | |
|---|---|---|
| CN | 200410038776.9 | 10/2004 |
| EP | 1195684 A1 | 4/2002 |
| JP | 06282929 A * | 10/1994 |
| JP | 8-7475 | 1/1996 |
| JP | 2001-184789 | 7/2001 |
| JP | 2003-132624 | 5/2003 |
| KR | 2002-0025343 | 4/2002 |
| KR | 2002-0073810 | 9/2002 |

OTHER PUBLICATIONS

Anonymous: "Advanced Encryption Technology—AES Encryption Information : Encryption Specification AE-2 (full specification for creating WinZip-compatible AES-encrypted Zip files)" XP002356725, Jan. 20, 2004 (11 pgs) (in English).

(Continued)

*Primary Examiner* — David García Cervetti
*Assistant Examiner* — Fatoumata Traore
(74) *Attorney, Agent, or Firm* — Staas & Halsey LLP

(57) ABSTRACT

A data writing and reproducing device using a password when writing and reproducing data is provided. The data writing and reproducing device includes a signal processor to scramble video data using an encryption key, a data writing module to write the video data scrambled by the signal processor to a recording medium, a key signal input part to provide a function to input a password, and a controller to generate the encryption key from the password and to provide the encryption key to the signal processor. The recording medium storing data by use of the data writing and reproducing device is reproducible only through a CSS-compliant reproducing device. Accordingly, the data is protected from illegal copying and viewing by a third party and the possibility of hacking can be reduced.

14 Claims, 3 Drawing Sheets

OTHER PUBLICATIONS

B. Kaliski: "RFC 2898" Internet RFC/STD/FYI /BCP Archives, XP002356726, Sep. 2000 (29 pgs) (in English).

European Search Report for European Patent Application No. 05254593.6 dated Dec. 16, 2010 (5 pgs) (In English).

* cited by examiner

PASSWORD-PROTECTED DATA WRITING AND REPRODUCING DEVICE AND METHOD

CROSS-REFERENCE TO RELATED APPLICATION

This application claims the benefit of Korean Patent Application No. 2004-57900 filed on Jul. 24, 2004 in the Korean Intellectual Property Office, the entire disclosure of which is incorporated herein by reference.

BACKGROUND OF THE INVENTION

1. Field of the Invention

The present invention generally relates to a password-protected data writing and reproducing device and method. More specifically, embodiments of the present invention relate to a data writing and reproducing device for and method of storing a password in a certain area of a recording medium to generate an encryption key which scrambles and descrambles data, reproducing and descrambling the data when the password is verified as the data is reproduced.

2. Description of the Related Art

Development of electronic technologies has led to the widespread use of data writing and reproducing devices serving various functions of general users. More recent data writing and reproducing devices implement a lock function which restricts data reproduction by setting a password. Accordingly, it is possible to prevent a third party who does not know the password from accessing and viewing video data by use of the data writing and reproducing devices.

However, if the lock function of the data writing and reproducing device is released or another data writing and reproducing device attempts to reproduce the recording medium, it is impossible to prevent viewing of the video data. In addition, if the recording medium stores the user's private information, a third party can access and obtain the private information.

To prevent illegal viewing or copying of a digital versatile disk (DVD), the Content Scrambling System (CSS) algorithm was introduced. The CSS algorithm scrambles and records data of a DVD title by use of an encryption key having a special value, and descrambles the data so as to reproduce the related video. Although a content file "*.VOB" contained in the DVD title can be copied, it is impossible to copy the encryption key. In result, the related video is not reproduced correctly and illegal copying can be prevented.

However, as hacking programs such as DeCSS have been reverse engineered and released, the encryption key of a DVD can now be separately generated. Thus, it is hard to effectively prevent illegal copying or viewing.

SUMMARY OF THE INVENTION

The present invention has been developed in order to solve the problems discussed above and others associated with the conventional arrangement. An aspect of the present invention provides a data writing and reproducing device for and method of writing data to a recording medium by scrambling video data by use of an encryption key generated by combining a password, and writing data relating to the password on a certain section of the recording medium.

Another aspect of the present invention provides a data writing and reproducing device for and method of preventing a third party from hacking data by generating an encryption key which is a combination of a password, and descrambling reproduced video data when the password written to a recording medium matches a password input by a user reproducing the video data from the recording medium.

To achieve the above aspects of the present invention, a data writing and reproducing device is provided. The data writing and reproducing device comprises a signal processor to scramble video data using an encryption key, a data writing module to write the video data scrambled by the signal processor to a recording medium, a key signal input part to provide a function to input a password, and a controller to generate the encryption key from the password and to provide the encryption key to the signal processor.

The controller may control the data writing module to write the video data scrambled by the signal processor and password data, respectively, on a certain section of the recording medium.

The data writing and reproducing device may further comprise a data reproducing module to reproduce the video data from the recording medium, and an output part to transfer the video data reproduced by the data reproducing module to an external video display device.

The controller may control the data reproducing module and the output part to reproduce message data requesting the input of a user password from the recording medium and transfer the message data to the video display device when a reproduction command for the video data is received.

The controller may control the data reproducing module to reproduce the video data when a user password input through the key signal input part is compared with and matches the password data written on the recording medium.

The controller may generate the encryption key by combining the numbers of the password data and may control the signal processor to descramble the video data using the encryption key when the user password input through the key signal input part is compared with and matches the password data written to the recording medium.

Consistent with the above aspects of the present invention, a data reproducing device is provided comprising a data reproducing module to reproduce video data and password data written to a recording medium, a signal processor to descramble the video data reproduced at the data reproducing module by use of an encryption key, a key signal input part to provide a function to input a user password, and a controller to generate the encryption key by combining the numbers of the password data and to provide the encryption key to the signal processor when the password data reproduced from the recording medium is compared with and matches the user password.

The data reproducing device may further comprise an output part to transfer the video data descrambled by the signal processor to an external video display device.

The controller may control the data reproducing module and the output part to reproduce message data requesting input of the user password from the recording medium and transfer the message data to the video display device when a reproduction command for the video data is received.

Consistent with the aspects of the present invention, a data writing and reproducing method is provided comprising generating an encryption key using password data, scrambling video data using the encryption key, writing the scrambled video data to a recording medium, and writing the password data on a certain section of the recording medium.

The data writing and reproducing method may further comprise displaying a message requesting input of a user password when a reproduction command for the video data is received, confirming the user password by comparing the user password with the password data when the user password is input, generating the encryption key by combining numbers of the password when the user password and password data match each other, and reproducing the video data from the recording medium and descrambling the video data using the encryption key.

The data writing and reproducing method may further comprise displaying a message indicating a password error when the user password and the password data fail to match each other.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of exemplary embodiments, taken in conjunction with the accompanying drawing figures of which.

DETAILED DESCRIPTION OF THE PREFERRED EMBODIMENTS

Figure 1:
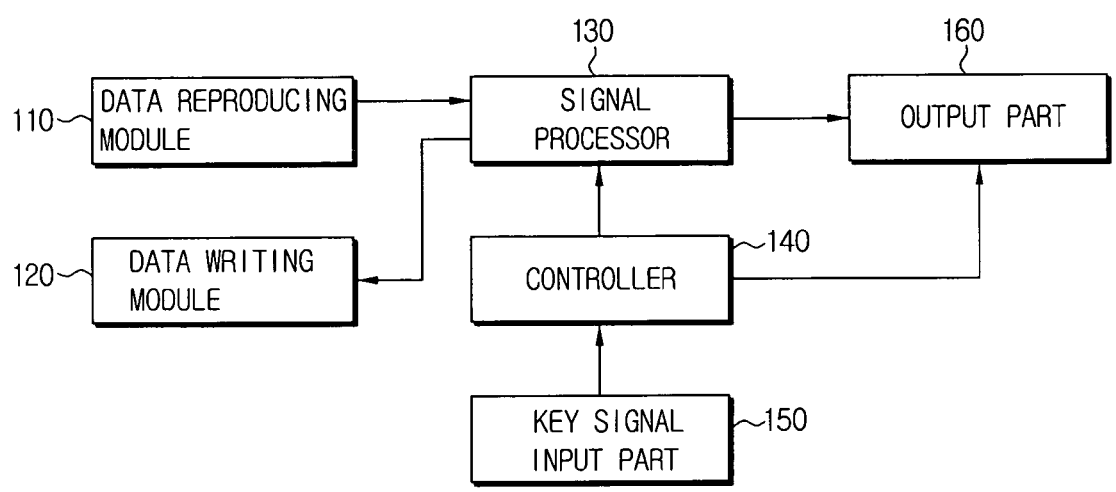
FIG. 1 is a block diagram of a data writing and reproducing device according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the drawings.

FIG. 1 illustrates a construction of a data writing and reproducing device according to an embodiment of the present invention. Referring to FIG. 1, the data writing and reproducing device includes a data reproducing module 110, a data writing module 120, a signal processor 130, a controller 140, a key signal input part 150, and an output part 160.

The key signal input part 150 provides functions enabling a user to input a reproduction command, a writing command and the like. When the user inputs the reproduction command or the writing command by use of a button key provided to the data writing and reproducing device or a remote controller, the key signal input part 150 recognizes and notifies the input command to the controller 140.

Upon receiving the data writing command through the key signal input part 150, the controller 140 controls the data writing module 110 to write data. Video data may be received from an external video display device, a camcorder, or the like connected through an interface, and recorded on the recording medium. In an embodiment, the Content Scrambling System (CSS) algorithm is used to scramble and write the video data. That is, the video data is mixed in a specific order by use of a certain encryption key, and thus prevented from being displayed correctly even when the video data is reproduced.

The signal processor 130 scrambles the video data using a certain encryption key. The encryption key may be generated by the controller 140 using a password. If the password includes, for example, four numbers, the encryption key may be generated by combining the four numbers.

The user can set the password using the key signal input part 150 while writing the data. The set password may be stored in a certain section of the recording medium and, as noted above, may be used to generate the encryption key required to reproduce the data. To prevent hacking of the password, the password may be encrypted and stored. That is, password data can be scrambled and stored. Each number or character of the password may be separately stored in a different section of the recording medium.

When the data writing and reproducing device is a digital versatile disk player (DVDP), the data writing module 110 stores the scrambled video data in a VOD file form on a DVD. In addition, information relating to the DVD may be recorded in an IFO (information) file form. Thus, data about the password is also recorded in an IFO file form.

The following explains how the data is reproduced by the data writing and reproducing device. Upon receiving the data reproduction command through the key signal input part 150, the controller 140 controls the data reproducing module 110 to generate password data. In case of a DVDP, the password data may be extracted from an IFO file of the DVD by opening the IFO file.

The controller 140 controls so as to transfer and display message data requesting input of the password on a screen of the video display device. The message data may utilize message data stored on a certain section of the recording medium. Specifically, in the case of a DVDP, when a DVD title is inserted into the DVDP, an introduction video (such as moving picture previews) and a menu screen are displayed. The menu screen may show a menu including options such as play and scene selection. The video is reproduced when the user selects play using a remote controller or other input device. Data about the menu screen is stored as an IFO file. A password input menu is added onto the menu screen so as to reproduce the video data only when the password is input and verified. For the sake of understanding, the password input by the user to reproduce data is referred to as a user password.

The controller 140 confirms whether the user password input through the message window matches the password stored in the recording medium. If so, the controller 140 generates an encryption key using the password. The generated encryption key is provided to the signal processor 130. The controller 140 controls the data reproducing module 110 to reproduce the video data.

The signal processor 130 descrambles the data reproduced by the data reproducing module 110 by use of the encryption key provided from the controller 140. The descrambled data is transferred to the external video display device by the output part 160.

If the user password does not match the password stored on the recording medium, the controller 140 controls so as to transfer and display message data indicating the password is incorrect on the screen of the video display device. The message data indicating the password is incorrect may be stored in the recording medium.

A data reproducing device having only a reproduction function can implement the lock function or a copy prevention function by descrambling the video data using the encryption key stored in the recording medium. In such an embodiment, the data reproducing device includes the same parts as shown in FIG. 1 except for the data writing module 120.

Figure 2:
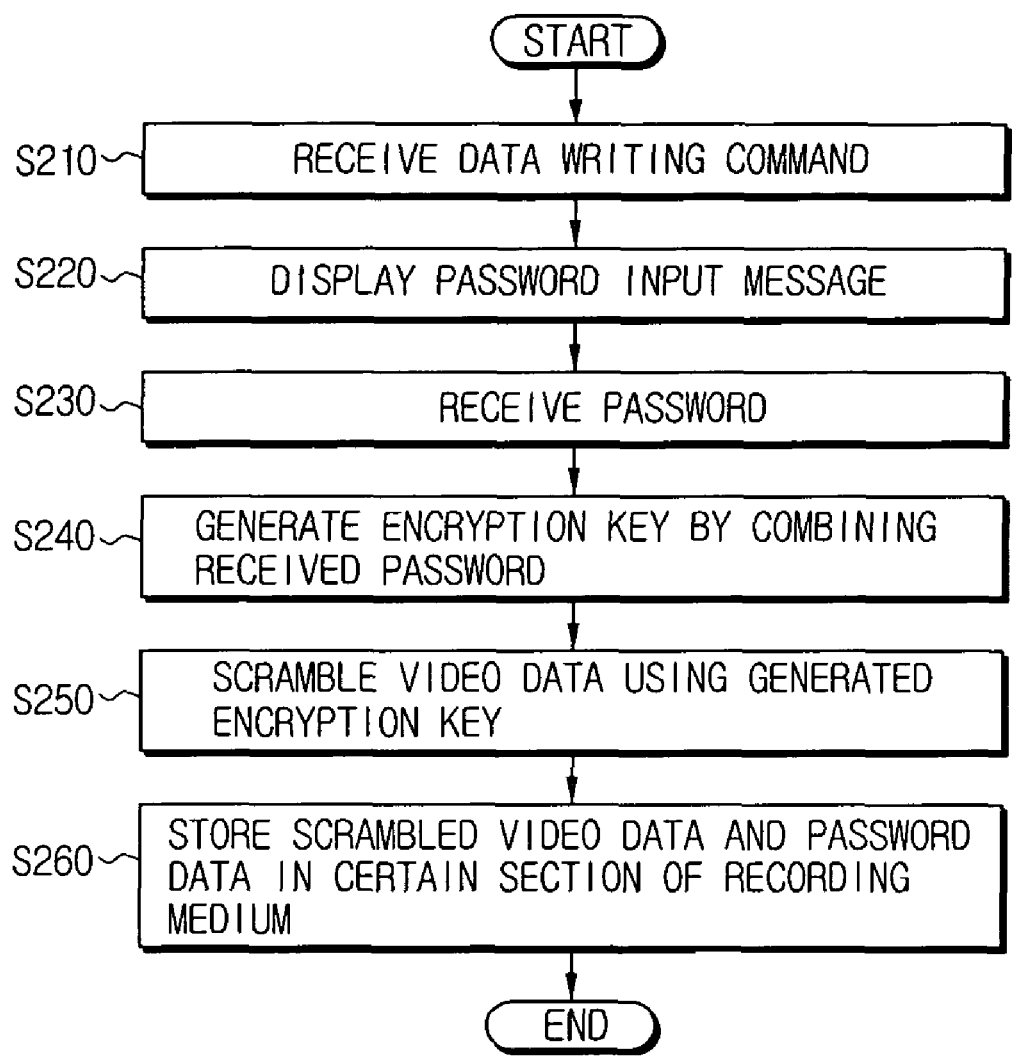
FIG. 2 is a flowchart of a data writing method according to an embodiment of the present invention.

FIG. 2 is flowchart of a data writing method according to an embodiment of the present invention. Referring to FIG. 2, when a user inputs a data writing command, the controller 140 recognizes the data writing command (S210). Certain message data stored on the recording medium is transferred to the video display device to display a password input message (S220).

When the user inputs the password (S230), the controller 140 generates the encryption key by combining the numbers or characters of the password (S240). The video data to be written is scrambled using the generated encryption key (S250).

The scrambled video data is written to the recording medium. Data about the password used to generate the encryption key is written in a certain section of the recording medium (S260). Thus, the video data can be descrambled for the reproduction.

Figure 3:
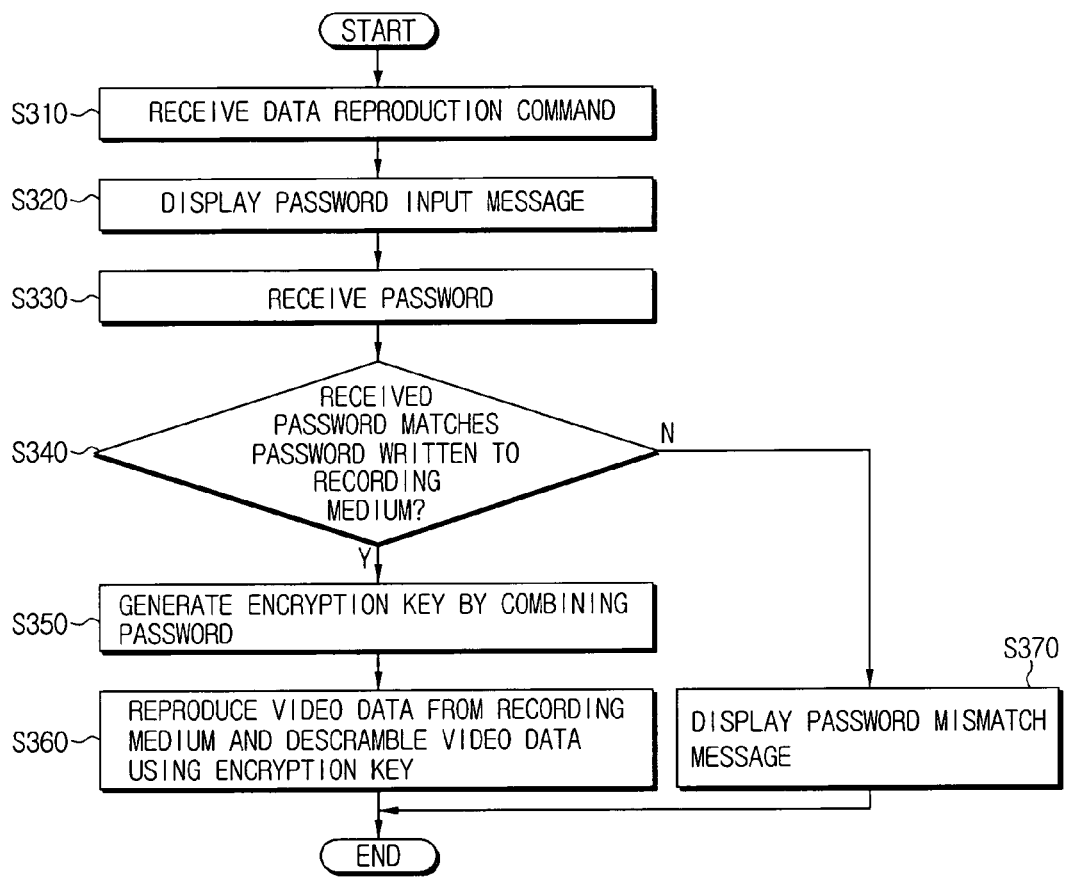
FIG. 3 is a flowchart of a data reproducing method according to an embodiment of the present invention.

FIG. 3 is a flowchart of a data reproducing method according to an embodiment of the present invention. Referring to FIG. 3, when a user inputs a data reproduction command (S310), a message requesting password input is displayed on the screen of the video display device (S320). The controller 140 can reproduce the data relating to the password input menu from a certain section of the recording medium and transfer the data to the video display device.

Upon receiving the password from the user (S330), the password in the recording medium is reproduced and compared with the received password (S340).

If the passwords match each other, the encryption key is generated by combining the numbers or characters of the password (S350). The video data is reproduced from the recording medium and descrambled using the encryption key (S360).

If the passwords do not match, a password error message is reproduced and transferred to the video display device (S370).

In accordance with embodiments of the present invention, a third person who does not know the password cannot reproduce video data correctly.

In light of the foregoing as mentioned above, a different password is set and recorded for the recording medium. Thus, a third person who does not know the password can not descramble and reproduce video data correctly because the encryption key is not generated from the password. If the recording medium is illegally copied, data reproduction is impossible because of the password, so as to prevent illegal copying and viewing. Particularly, as the password differs for each recoding medium, the existing hacking methods cannot obtain the encryption key. Therefore, the possibility of hacking is greatly reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A data writing and reproducing device comprising:
a signal processor to scramble video data using an encryption key;
a data writing module to write the video data scrambled by the signal processor to a recording medium;
a key signal input part to provide a function to input a password; and
a controller to generate the encryption key by combining characters of the password with each other and to provide the encryption key to the signal processor,
wherein the controller separately stores each character of the password in a different sector of the recording medium.

2. The data writing and reproducing device according to claim 1, wherein the controller controls the data writing module to write the video data scrambled by the signal processor and password data, respectively, on a certain section of the recording medium.

3. The data writing and reproducing device according to claim 2, further comprising:
a data reproducing module to reproduce the video data from the recording medium; and
an output part to transfer the video data reproduced by the data reproducing module to an external video display device.

4. The data writing and reproducing device according to claim 3, wherein the controller controls the data reproducing module and the output part to reproduce message data requesting the input of a user password from the recording medium and transfer the message data to the video display device when a reproduction command for the video data is received.

5. The data writing and reproducing device according to claim 4, wherein the controller controls the data reproducing module to reproduce the video data when a user password input through the key signal input part is compared with and matches the password data written on the recording medium.

6. The data writing and reproducing device according to claim 5, wherein the controller generates the encryption key by combining the numbers of the password data and controls the signal processor to descramble the video data using the encryption key when the user password input through the key signal input part is compared with and matches the password data written to the recording medium.

7. A data reproducing device comprising:
a data reproducing module to reproduce video data and password data written to a recording medium;
a signal processor to descramble the video data reproduced at the data reproducing module by use of an encryption key;
a key signal input part to provide a function to input a user password; and
a controller to generate the encryption key by combining the numbers of the password data and to provide the encryption key to the signal processor when the password data reproduced from the recording medium is compared with and matches the user password,
wherein each of the numbers of the password is separately stored in a different sector of the recording medium.

8. The data reproducing device according to claim 7, further comprising an output part to transfer the video data descrambled by the signal processor to an external video display device.

9. The data reproducing device according to claim 8, wherein the controller controls the data reproducing module and the output part to reproduce message data requesting input of the user password from the recording medium and transfer the message data to the video display device when a reproduction command for the video data is received.

10. A data writing and reproducing method comprising:
generating, using a processor, an encryption key by combining characters of password data with each other;
scrambling video data using the encryption key;
writing the scrambled video data to a recording medium; and
writing the password data on a certain section of the recording medium,
wherein in the writing of the password data, each character of the password data is separately written in a different sector of the recording medium.

11. The data writing and reproducing method according to claim 10, further comprising:
- displaying a message requesting input of a user password when a reproduction command for the video data is received;
- confirming the user password by comparing the user password with the password data when the user password is input;
- generating the encryption key by combining numbers of the password when the user password and password data match each other; and
- reproducing the video data from the recording medium and descrambling the video data using the encryption key.

12. The data writing and reproducing method according to claim 11, further comprising displaying a message indicating a password error when the user password and the password data fail to match each other.

13. A method comprising:
- receiving a user password and a stored password stored on a recording medium;
- comparing the user password and the stored password;
- generating an encryption key by combining characters of one of the stored password or the user password if the user password matches the stored password; and
- descrambling, using a processor, data stored on the recording medium using the encryption key,
- wherein each character of the stored password is separately stored in a different sector of the recording medium.

14. The method of claim 13, wherein the receiving of a user password and a stored password comprises:
- receiving a numerical password.

* * * * *